US012749781B2

(12) United States Patent
Shin

(10) Patent No.: US 12,749,781 B2
(45) Date of Patent: Sep. 29, 2026

(54) SYSTEM FOR DEICING BLACK ICE ON ROAD SURFACE USING INVISIBLE LIGHT BASED ON AI

(71) Applicant: SRD KOREA CO., LTD., Gyeongsangbuk-do (KR)

(72) Inventor: Dong Hen Shin, Gyeongsangbuk-do (KR)

(73) Assignee: SRD KOREA CO., LTD., Gyeongsangbuk-do (KR)

( * ) Notice: Subject to any disclaimer, the term of this patent is extended or adjusted under 35 U.S.C. 154(b) by 268 days.

(21) Appl. No.: 18/794,217

(22) Filed: Aug. 5, 2024

(65) Prior Publication Data

US 2025/0376823 A1 Dec. 11, 2025

(30) Foreign Application Priority Data

Jun. 5, 2024 (KR) ........................ 10-2024-0073974

(51) Int. Cl.

*H01M 50/545* (2021.01)
*E01H 5/10* (2006.01)

(Continued)

(52) U.S. Cl.

CPC .......... *H01M 50/545* (2021.01); *E01H 5/106* (2013.01); *G01N 25/00* (2013.01); *G01S 15/08* (2013.01); *G01W 1/02* (2013.01); *G06V 10/70* (2022.01); *G06V 20/50* (2022.01); *H01M 10/0585* (2013.01); *H01M 50/103* (2021.01); *H01M 50/119* (2021.01); *H01M 50/14* (2021.01); *H01M 50/548* (2021.01); *H01M 50/553* (2021.01); *H01M 50/562* (2021.01); *H01M 50/586* (2021.01); *H01M 50/59* (2021.01)

(58) Field of Classification Search

CPC ............. H01M 50/545; H01M 50/586; H01M 50/548; H01M 50/59; H01M 50/119; H01M 50/103; H01M 50/553; H01M 50/562; H01M 50/14; H01M 10/0585; G06V 10/70; G06V 20/50; E01H 5/106; G01N 25/00; G01S 15/08; G01W 1/02

See application file for complete search history.

(56) References Cited

FOREIGN PATENT DOCUMENTS

| | | | |
|---|---|---|---|
| JP | H09166666 A | * | 6/1997 |
| JP | 2006299622 A | * | 11/2006 |
| KR | 10-2221831 B1 | | 3/2021 |

* cited by examiner

*Primary Examiner* — Andrew Smyth
(74) *Attorney, Agent, or Firm* — The PL Law Group, PLLC

(57) ABSTRACT

The system for deicing black ice includes a plurality of laser scanners that are arranged at intervals along a road, each laser scanner including a light source unit, a non-contact temperature sensor, and a control unit that controls an operation of radiating the laser to the area in charge, a weather sensor that measures a temperature and humidity, and an integrated controller that communicates with the plurality of laser scanners. The integrated controller determines whether the laser is radiated to the road surface based on at least one of the measured temperature and humidity, and when the laser radiation is determined, generates a control signal to activate at least one laser scanner, and the control unit determines a heating area, and generates a pulse signal to turn on/off a light source unit so that the laser is radiated in accordance with a shape and range of the heating area.

9 Claims, 8 Drawing Sheets

(51) Int. Cl.

| | |
|---|---|
| *G01N 25/00* | (2006.01) |
| *G01S 15/08* | (2006.01) |
| *G01W 1/02* | (2006.01) |
| *G06V 10/70* | (2022.01) |
| *G06V 20/50* | (2022.01) |
| *H01M 10/0585* | (2010.01) |
| *H01M 50/103* | (2021.01) |
| *H01M 50/119* | (2021.01) |
| *H01M 50/14* | (2021.01) |
| *H01M 50/548* | (2021.01) |
| *H01M 50/553* | (2021.01) |
| *H01M 50/562* | (2021.01) |
| *H01M 50/586* | (2021.01) |
| *H01M 50/59* | (2021.01) |

SYSTEM FOR DEICING BLACK ICE ON ROAD SURFACE USING INVISIBLE LIGHT BASED ON AI

CROSS-REFERENCE TO RELATED APPLICATION AND CLAIM OF PRIORITY

This application claims the benefit under 35 USC § 119 of Korean Patent Application No. 10-2024-0073974, filed on Jun. 5, 2024, in the Korea Intellectual Property Office, the entire disclosure of which is incorporated herein by reference for all purposes.

BACKGROUND

1. Technical Field

The present disclosure relates to a system for deicing black ice using invisible light, and more particularly, to a system for deicing black ice using invisible light for deicing black ice on a road surface by controlling an area where invisible light such as a laser is scanned.

2. Background of Related Art

The driving stability of a vehicle depends on road surface conditions as well as a visibility distance that a driver may secure. For example, snow or frozen ice that accumulates on the road surface due to snowfall significantly reduces frictional resistance between tires and the road surface. Condensation on a road surface or black ice that occurs when rainwater freezes thinly on the road surface due to very low temperatures after rainfall cannot be observed with a driver's naked eye, and thus, becomes more dangerous.

In addition, when there is a sudden temperature difference between air and the ground, even if there is no separate rainfall or snowfall, the water vapor in the air freezes immediately upon contact with the ground, so the invisible black ice may occur on the road surface. In particular, on foggy days, when driver's vision is blocked, the black ice caused by fog freezing on the road surface is even more invisible. Since the fog and black ice generated on roads where vehicles travel at high speed, such as highways, may lead to major accidents, there is no alternative other than for drivers to drive carefully.

Despite rapidly changing road surface conditions due to weather conditions, various technologies have been proposed to provide a safe driving environment. For example, salt water spray facility is installed on a road designated as a freezing risk area to spray calcium chloride onto the road and lower a freezing point of a road surface, thereby preventing freezing, or hot wires are buried in a bottom surface of the road to apply a current to the hot wires according to weather conditions, thereby preventing freezing.

However, methods using the salt water spray facility have several disadvantages. For example, brine containing calcium chloride may flow from road surfaces into adjacent agricultural fields and contaminate nearby soil. When the sprayed salt water gets on vehicles, the vehicles will corrode. When salt water gets on civil engineering structures made of concrete, such as bridges or retaining walls, safety problems such as deterioration of the concrete and reduced durability of the facility may also be caused.

In addition, the method of burying hot wires in a road has the limitations of low economic feasibility in that it requires a lot of money to install the structure and consumes a lot of electrical energy to operate the structure.

In order to solve this problem, the applicant has applied for and received registration for "Anti-slip Device by Road Ice" in Korean Patent No. 10-2221831 (Registration Date: Feb. 23, 2021, hereinafter referred to as 'Related Art Document'). The Related Art Document proposed that hot air is delivered to a blowing pipe using a hot air producing means and a blowing fan, and that is sprayed onto the road using a pressure spray nozzle continuously provided in the blowing pipe.

However, the hot air spray method has a limitation in that the pressure of the hot air discharged from the pressure spray nozzle is significantly reduced, and thus, the hot air may not reach the opposite side of the road.

Accordingly, there has been a need for technology for deicing black ice by radiating light onto a road surface, in addition to direct physical or chemical methods, such as salt water spraying, hot air spraying, and hot wire burial.

SUMMARY

The present disclosure provides a system for deicing black ice capable of deicing the black ice from a road surface by radiating invisible light to the road surface.

According to an aspect of the present disclosure, a system for deicing black ice on a road surface using invisible light based on AI includes: a plurality of laser scanners that are arranged at intervals along a road, each laser scanner including a light source unit that emits a laser, a non-contact temperature sensor that measures a temperature of an area in charge of the road surface, and a control unit that controls an operation of radiating the laser to the area in charge; a weather sensor that measures a temperature and humidity of a surrounding environment; and an integrated controller that communicates with the plurality of laser scanners, in which the integrated controller determines whether the laser is radiated to the road surface based on at least one of the temperature and humidity measured by the weather sensor, and when the laser radiation is determined, generates a control signal to activate at least one laser scanner to be operated among the plurality of laser scanners, and the control unit of the laser scanner activated by the integrated controller determines a heating area requiring the laser radiation in the area in charge based on the temperature measured by the non-contact temperature sensor, and generates a pulse signal to turn on/off a light source unit of the at least one activated laser scanner so that the laser is radiated in accordance with a shape and range of the heating area.

The laser scanner may include a galvanometer including two reflectors each rotating about different orthogonal axes x and y, and the control unit may set a cycle of the pulse signal based on a speed at which the reflector rotates.

The control unit may set an on-off duty ratio of the pulse signal based on a ratio of a width of the heating area to a length of the scanning line of the laser that can be radiated to the road surface by the galvanometer.

The control unit may set the heating area encompassing a plurality of points with different temperatures measured by the non-contact temperature sensor, and control the galvanometer so that the speed at which the reflector rotates varies based on the temperature difference.

Each of the laser scanners may further include an ultrasonic sensor that detects a distance from an object existing on the road surface. The control unit may control the light source unit to be turned off when the ultrasonic sensor detects the object within a preset distance.

The system for deicing black ice may further include a server that remotely communicates with the integrated controller. The server may transmit a control command for controlling each of the plurality of scanners to the integrated controller.

The system for deicing black ice may further include a camera that captures the road surface. The integrated controller may determine a road surface condition by analyzing a road surface image captured by the camera through an AI learning model, and determine whether the black ice is generated on the road surface and whether the laser is radiated to the road surface according to the determined road surface condition.

The integrated controller may determine whether to activate the laser scanner based on big data including topographical characteristics, regional weather, temperature, and humidity information.

The system for deicing black ice may further include a camera that captures the road surface. The integrated controller may detect topography on the road surface by analyzing the image captured by the camera through an AI learning model, and control the laser scanner to selectively radiate the laser according to the topography on the road surface.

Each of the laser scanners may further include an actuator that changes a direction in which the galvanometer is directed. The control unit may control the actuator to change the direction of the galvanometer toward the heating area.

DETAILED DESCRIPTION

Hereinafter, embodiments of the present disclosure will be described in more detail with reference to the accompanying drawings. In addition, in describing the present disclosure, when it is decided that a detailed description for known functions or configurations related to the present disclosure may obscure the gist of the present disclosure, the detailed description thereof will be omitted. Further, terms to be described later are defined in consideration of functions in the present disclosure and may be changed depending on the intention or relationship of users and operators. Therefore, these terms should be defined based on contents throughout the present specification.

Figure 1:
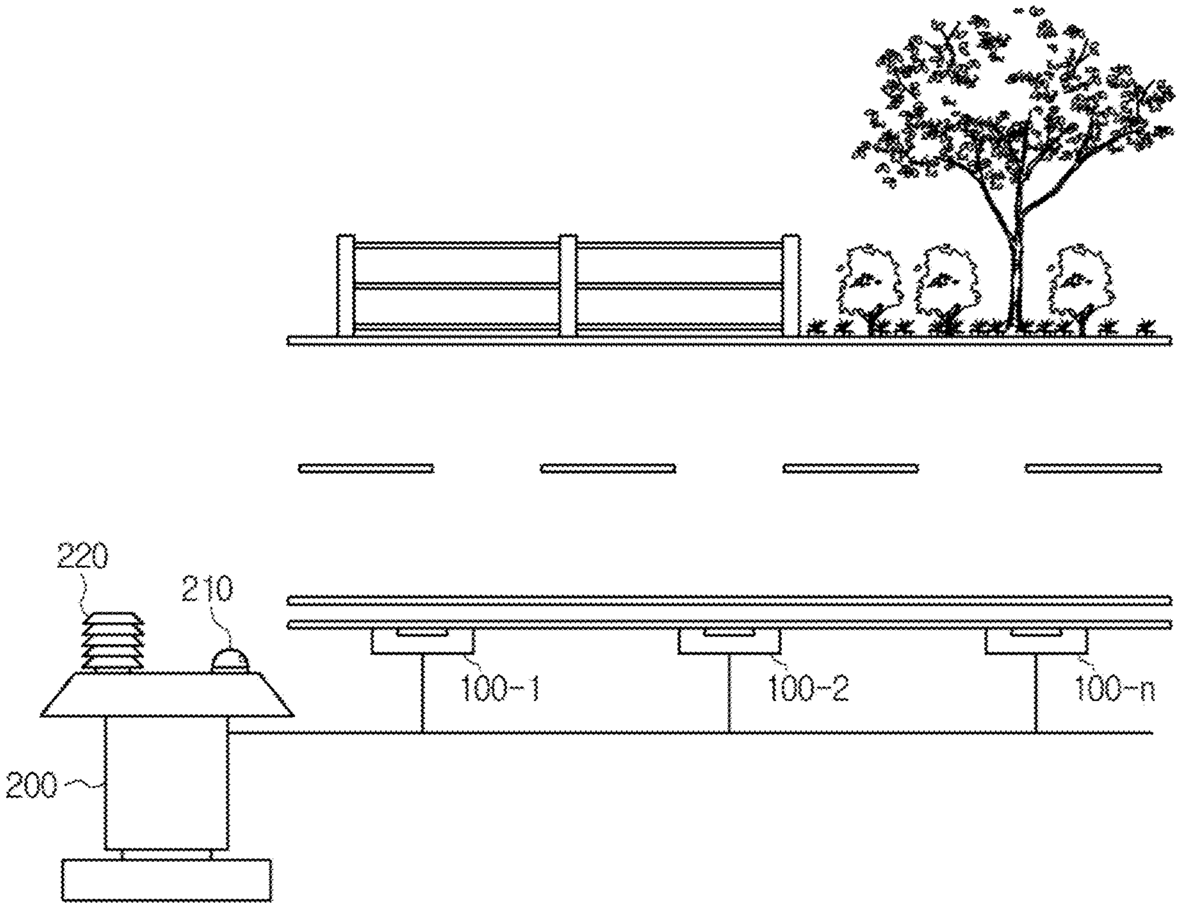
FIG. 1 is a diagram illustrating a configuration of a system for deicing black ice on a road surface using invisible light according to an embodiment of the present disclosure.

FIG. 1 is a diagram illustrating a configuration of a system for deicing black ice on a road surface using invisible light according to an embodiment of the present disclosure.

Referring to FIG. 1, the system for deicing black ice on a road surface using invisible light according to an embodiment of the present disclosure includes a plurality of laser scanners 100-1, 100-2, and **100-*n* and an integrated controller 200**.

In the illustrated embodiment, the system includes, but is not limited to, three laser scanners 100-1, 100-2, and **100-*n***, and may include two laser scanners or more than three laser scanners.

The plurality of laser scanners 100-1, 100-2, and **100-*n* are arranged at intervals along the road. In addition, the laser scanners 100-1, 100-2, and 100-*n* may radiate a laser to the road surface. The method of radiating a laser may be scanning. In addition, the laser scanners 100-1, 100-2, and 100-*n* include a non-contact temperature sensor that measures a temperature of a road surface, and the non-contact temperature sensor measures temperatures of a plurality of points on the road surface. The configuration and operation of the laser scanner for scanning a laser on the road surface and measuring the temperature of the road surface will be described in detail below with reference to FIG. 3**.

In the embodiment illustrated in FIG. 1, the plurality of laser scanners 100-1, 100-2, and **100-*n* are arranged at equal intervals along the road, but the present disclosure is not limited thereto. Each laser scanner 100-1, 100-2, and 100-*n* has a designated area in charge. In other words, a series of laser scanners 100-1, 100-2, and 100-*n*** each take charge of a certain area of the road surface and deice black ice from that corresponding area. The areas in charge assigned to each laser scanner may be mutually exclusive or at least partially overlap.

In the embodiment illustrated in FIG. 1, the laser scanners 100-1, 100-2, and **100-*n* are arranged along a boundary stone or curb between a roadway and a sidewalk. However, a separate structure for installing the laser scanners 100-1, 100-2, and 100-*n* may be used. In another use example, the laser scanners 100-1, 100-2, and 100-*n* are installed on bridges that are prone to generate the black ice. In this case, the laser scanners 100-1, 100-2, and 100-*n*** may be installed on an upper structure, a protective wall, a railing, etc., of the bridge.

The integrated controller 200 communicates with the plurality of laser scanners 100-1, 100-2, and **100-*n* in a wired or wireless communication manner. The integrated controller 200 may individually control each of the plurality of laser scanners 100-1, 100-2, and 100-*n*. The integrated controller 200 may transmit a control signal to at least one of the plurality of laser scanners 100-1, 100-2, and 100-*n*** through an established communication method.

The communication method connecting the integrated controller 200 and the laser scanners 100-1, 100-2, and **100-*n* may be serial communication or Ethernet communication. For example, the integrated controller 200 may be connected to the plurality of laser scanners 100-1, 100-2, and 100-*n* through communication cables each connected to a plurality of communication ports. The integrated controller 200 may transmit the control signals for controlling each of the plurality of laser scanners 100-1, 100-2, and 100-*n*** through the communication connection.

In addition, the integrated controller 200 may receive signals from each laser scanner 100-1, 100-2, and **100-*n*** through the communication connection. The integrated controller 200 may receive a signal about the temperature of the road surface measured by the non-contact temperature sensor of the laser scanner. In addition, the integrated controller 200 may receive signals on information such as defrost operation status, time elapse, and detection of objects in front, from each of the plurality of laser scanners 100-1, 100-2, and 100-*n*.

The integrated controller 200 may determine whether the black ice is generated on the road surface and whether the laser is radiated to the road surface through an AI learning model. In other words, the laser radiation of the laser scanner 100 to the road surface is performed not by a manager's command, but by automatic control of the integrated controller 200. The AI learning model may be used to increase the accuracy of determination. For the machine learning, actual data and macroscopic data about the environment around the road may be collected.

The integrated controller 200 may include a camera 210 that captures the road surface. The camera 210 may be a typical IP camera that captures real images, or it may be a thermal image camera or a night vision camera that allows easy identification of objects even at night. In another embodiment, the camera 210 may not be included in the integrated controller 200 but may be configured like a CCTV installed on a separate structure, such as a pillar. In this case, the camera 210 may communicate with the integrated controller 200 through various wired/wireless communication methods.

The road surface image captured by the camera 210 may be transmitted to the integrated controller 200, and the integrated controller 200 may analyze the captured road surface image. The integrated controller 200 may use an AI learning model to analyze the image captured by the camera 210.

The AI learning model may identify vehicles, people, animals, road facilities, etc., from images. For example, the AI learning model distinguishes between people walking, people falling, and people riding bicycles. For example, the AI learning model distinguishes a bird flying across a road, or an animal carcass hit by a car, etc. Accordingly, the integrated controller 200 may detect topography of the road surface from the image. In the embodiment illustrated in FIG. 1, the integrated controller 200 may identify lanes drawn on the road surface, median strips at an edge of the road, grass, and trees. For example, it may identify drains at an edge of a road, speed bumps, sinkholes, depressions, and other objects that have fallen on a road.

In addition, the AI learning model may analyze the image and determine the condition of the captured road surface. The AI learning model may extract feature vectors by analyzing the road surface image captured by the camera 210 in real time. The feature vector may be obtained by extracting a statistical moment vector for a luminance component distribution for a sample area in an image and extracting feature vectors for each wavelength based on multidimensional small field segmentation for the luminance component distribution. A database for determining road surface conditions from the feature vectors may be included in the integrated controller 200. The database stores feature vectors extracted for dry road surfaces, wet road surfaces, ice road surfaces, and frost road surfaces. By comparing feature vectors extracted from image samples with moment feature vectors stored in the database in real time, the road surface condition indicated by the feature vectors that have similarity or consistency with the trend of such feature vectors may be determined to be the captured road surface condition.

The integrated controller 200 may control the laser scanner to selectively radiate the laser according to the topography of the road surface. The topography of the road surface may be detected by allowing the AI learning model to analyze the road surface image captured by the camera 210. For example, the black ice may be generated, but there is no need to heat installations such as a divider in the middle of a carriageway or a sound barrier at an edge of a road. When dry grass or wood is heated with a laser in winter, there is a risk of fire. Accordingly, the integrated controller 200 may control the laser scanner 100 so that the laser is not radiated to the heating area even if it belongs to the heating area. Areas with uneven road surfaces are prone to accumulation of water and formation of ice, so sufficient heating is necessary. Therefore, the integrated controller 200 may control the laser scanner 100 so that a large amount of laser energy may be transmitted to these locations.

The integrated controller 200 includes a weather sensor 220 that measures the temperature and humidity of the surrounding environment. The black ice is very likely to be generated when the road surface is wet due to rain, snow, fog, etc., and the temperature falls below zero. The weather sensor 220 measures the temperature and humidity of the environment around the road where the system is built, making it possible to whether there is an environment in which black ice may form on the road surface under jurisdiction. The weather sensor 220 may be implemented as a weather observation device, and the measured temperature and sensor may be displayed in numerical values through a display device. In this case, a local manager may check a weather station and manually activate the laser scanner. In addition to the temperature and humidity, the weather sensor 220 may further measure environmental factors such as air quality, noise, ultraviolet rays, wind direction, and wind speed. In another embodiment, the weather sensor 220 may not be included in the integrated controller 200 but may be configured as an independent device installed on a separate structure, such as a tall pillar. In this case, the weather sensor 220 may communicate with the integrated controller 200 through various wired/wireless communication methods.

The temperature/humidity information measured by the weather sensor 220 may be used to supplement the road surface condition determined by the AI module from the image. For example, when the road surface condition predicted by the AI learning module is 'icy road' or 'wet road', if the temperature of the road surface is below zero or the air temperature is 4° C. or lower, the road surface is determined to be 'icy road'.

The integrated controller 200 determines whether the laser is radiated to the road surface based on at least one of the temperature and humidity measured by the weather sensor 220. The standard for determining whether to radiate the laser may be a preset temperature and/or humidity range as the black ice generation conditions, and/or may be a result predicted by the machine learning. For example, when the temperature measured by the weather sensor 220 is below zero and the humidity is 80% or more, it is determined to perform the laser radiation to the road surface. Alternatively, for example, by tracking weather fluctuations for 24 hours, it is determined to perform the laser radiation when it rains during the day and the temperature drops sharply during the night to lead to the possibility of frost forming on the road or freezing of accumulated rainwater. Alternatively, the integrated controller 200 may make determinations that reflect geographical influences such as bridges or mountain valleys.

When the integrated controller 200 determines to radiate the laser, it activates at least one laser scanner to be operated among the plurality of laser scanners 100-1, 100-2, and **100-*n*. The activation may be implemented in a various forms, such as turning on a switch that supplies power to the laser scanner, transmitting an enable signal to the control unit of the laser scanner, or releasing a blocking screen that blocks the front of the laser scanner. The integrated controller 200 may selectively activate the laser scanners 100-1, 100-2, and 100-*n*. The integrated controller 200 may select the laser scanners 100-1, 100-2, and 100-*n*** to be activated depending on the location and environmental conditions.

The activated laser scanners 100-1, 100-2, and **100-*n* determine the heating area requiring the laser radiation in the area in charge based on the temperature measured by the non-contact temperature sensor. That is, the laser scanner 100 according to the present disclosure radiates the laser to a necessary portion of the entire area capable of laser scanning. This will be described below in detail with reference to FIGS. 3 to 5**B.

The activated laser scanners 100-1, 100-2, and **100-*n* generate pulse signals that control a light source unit of the activated laser scanner to be turned on and off so that the laser is radiated in response to the shape and range of the heating area. This will be described below in detail with reference to FIG. 6**.

The system for deicing black ice may further include a server that remotely communicates with the integrated controller 200. The network for remote communication may be an Internet network. In this case, the integrated controller 200 and the server may perform communication in compliance with the TCP/IP protocol. The remote communication may involve multiple communication networks rather than just one. For example, the integrated controller 200 and the server may be connected via a mobile communication network such as LTE or a local area network (LAN) such as Wi-Fi. The integrated controller 200 may notify the server of the information processed by the signals received from the laser scanners 100-1, 100-2, and **100-*n***.

The information that the integrated controller 200 notifies to the server through such remote communication may include an identifier such as a serial number of each laser scanner, a plurality of points where the non-contact temperature sensor corresponding to the laser scanner measures the temperature of the road surface, and the temperature measured at that point. The notification information may be the road surface image captured by the camera 210. The notification information may be the temperature and humidity measured by the weather sensor 220.

The server may be connected to one or more terminals (not illustrated) through the remote communication. The terminal may be connected to the server by the user to check the information notified to the server from the integrated controller 200, and transmit commands to control one or more laser scanners 100-1, 100-2, and **100-*n***.

The server may include the AI learning model. The server may use the AI learning model to analyze the information received from the integrated controller 200. For example, the AI module of the server may be trained from accumulated data under what temperature and humidity conditions the black ice is formed on the road surface. The AI module may train whether to effectively deice or prevent the black ice on the road surface when a certain heating area is set or a laser is irradiated in a certain way.

In addition, the integrated controller 200 may determine whether to activate the laser scanner 100 based on big data including topographical characteristics, regional weather, temperature, and humidity information. For example, the integrated controller 200 may acquire information such as climate change throughout the year, weather forecast, and surrounding rivers in a specific area, highly evaluate the possibility of black ice occurring on a specific road or road surface through the AI learning model, and command effective or preventive laser radiation to the laser scanner 100 in charge of the corresponding area. Such big data may be provided from the server.

The system for deicing black ice according to the present disclosure may have an effect of managing a wide road surface, setting the necessary heating area in the road surface, effectively radiating the laser to the heating area, securing a long lifespan of the device, providing adaptive defrosting measures to various road environments using the camera, and preventing the black ice before the black ice occurs.

Figure 2:
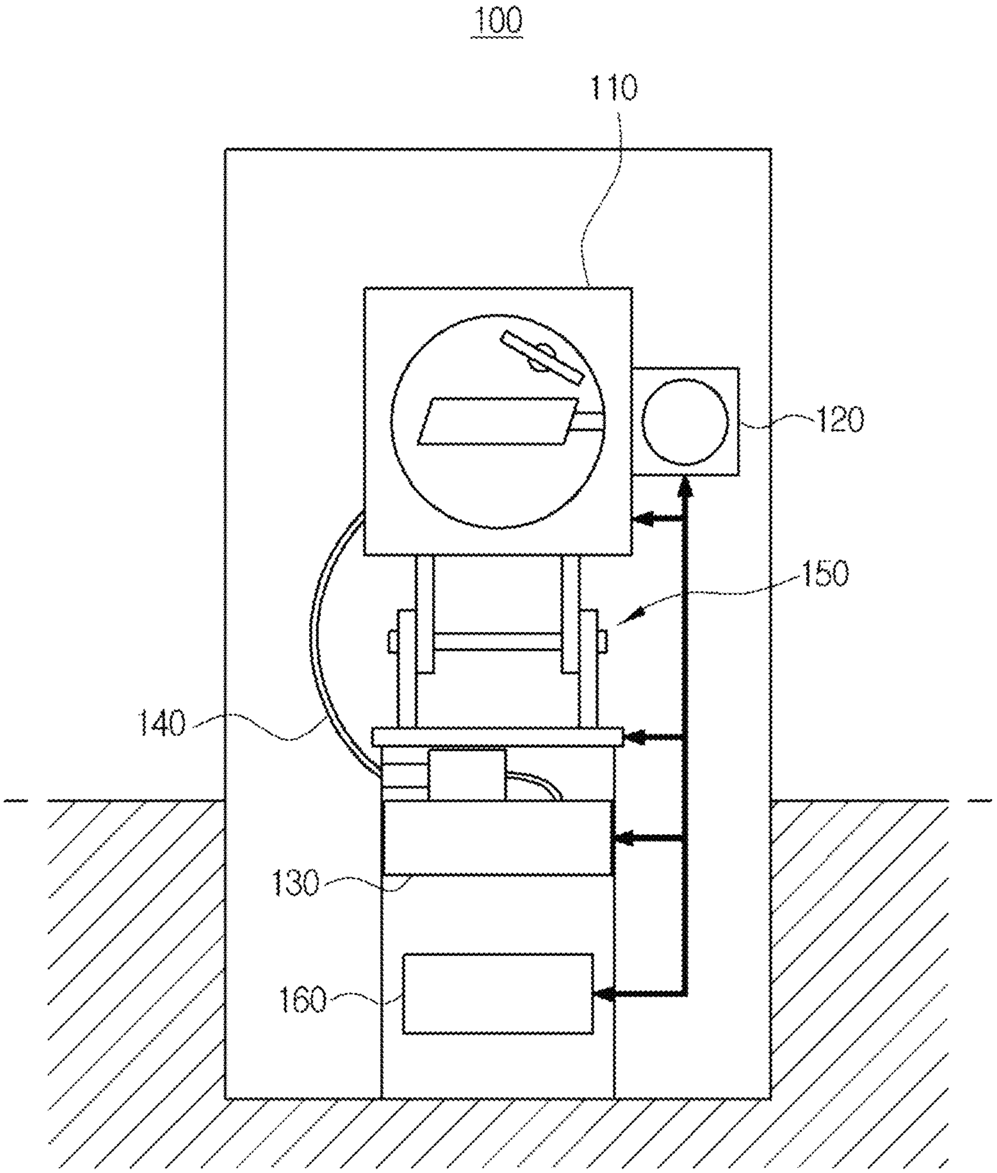
FIG. 2 is a diagram illustrating a configuration of a laser scanner according to an embodiment of the present disclosure.

FIG. 2 is a diagram illustrating a configuration of a laser scanner according to an embodiment of the present disclosure.

Referring to FIG. 2, the laser scanner 100 includes a galvanometer 110, an infrared temperature sensor 120, a laser light source unit 130, a waveguide 140, an actuator 150, and a control unit 160.

First, the laser scanner 100 is arranged toward the road somewhere at the edge of the road or bridge. The arrangement form of the laser scanner 100 is not limited. In one arrangement form, as illustrated in FIG. 2, about half of the total height of the laser scanner 100 is buried below the ground surface. The ground portion of the laser scanner 100 is surrounded by a curb except for an opening toward the front. The opening may be open, or closed with a special window (germanium) through which the infrared rays and lasers are transmitted. In this embodiment, the laser scanner 100 may be partially buried below the ground as illustrated, include a separate housing, and be erected next to a road, or be arranged on a pole such as a telephone pole. In addition, it is obvious that the laser scanner may be arranged in other ways and forms. For example, the laser scanner 100 installed on a bridge may be installed in or integrated into a protective wall.

The light source unit 130 emits laser, which is invisible light. The laser may have a wavelength and/or power suitable to increase the temperature of the road surface. The wavelength may be determined in an area where road paving materials such as asphalt may absorb laser energy well. The output may be determined depending on the distance from the laser scanner 100 to the road surface or the defrost speed.

The laser output from the light source unit 130 is guided by the waveguide 140 connected to the galvanometer 110. The waveguide 140 may be an optical fiber.

The galvanometer 140 changes the direction in which the laser entering through the waveguide 140 travels. The galvanometer 140 includes a reflector that rotates about two axes x and y that are orthogonal to each other. The reflector may be a mirror. Since the two reflectors and the laser's incident points are precisely aligned with each other, the reflectors turn at any angle, so the laser moves toward the shifted point by an amount corresponding to that angle. In addition, each reflector may rotate repeatedly by a motor. The repeated rotation operation of the two reflectors enables the laser to perform two-dimensional plane scanning. The galvanometers or galvo scanners are already well known to those skilled in the art, and therefore, detailed descriptions thereof will be omitted.

The galvanometer 140 is connected to the actuator 150. The actuator 150 changes the direction of the galvanometer 140. In the illustrated embodiment, the actuator 150 provides a left-right rotation about a vertical axis and an up-down rotation about a horizontal axis.

The infrared temperature sensor 120 or PIR sensor is a non-contact temperature sensor. The infrared temperature sensor 120 is attached to the side of the main body of the galvanometer 110 and moves together by the operation of the actuator 150. As a modified example, the infrared temperature sensor 120 may be configured separately from the galvanometer 110. In this case, a separate actuator is configured for the infrared temperature sensor 120 to enable the infrared temperature sensor 120 to measure the temperatures of various points distributed on the road surface. Next, this will be described with reference to FIG. 3.

Figure 3:
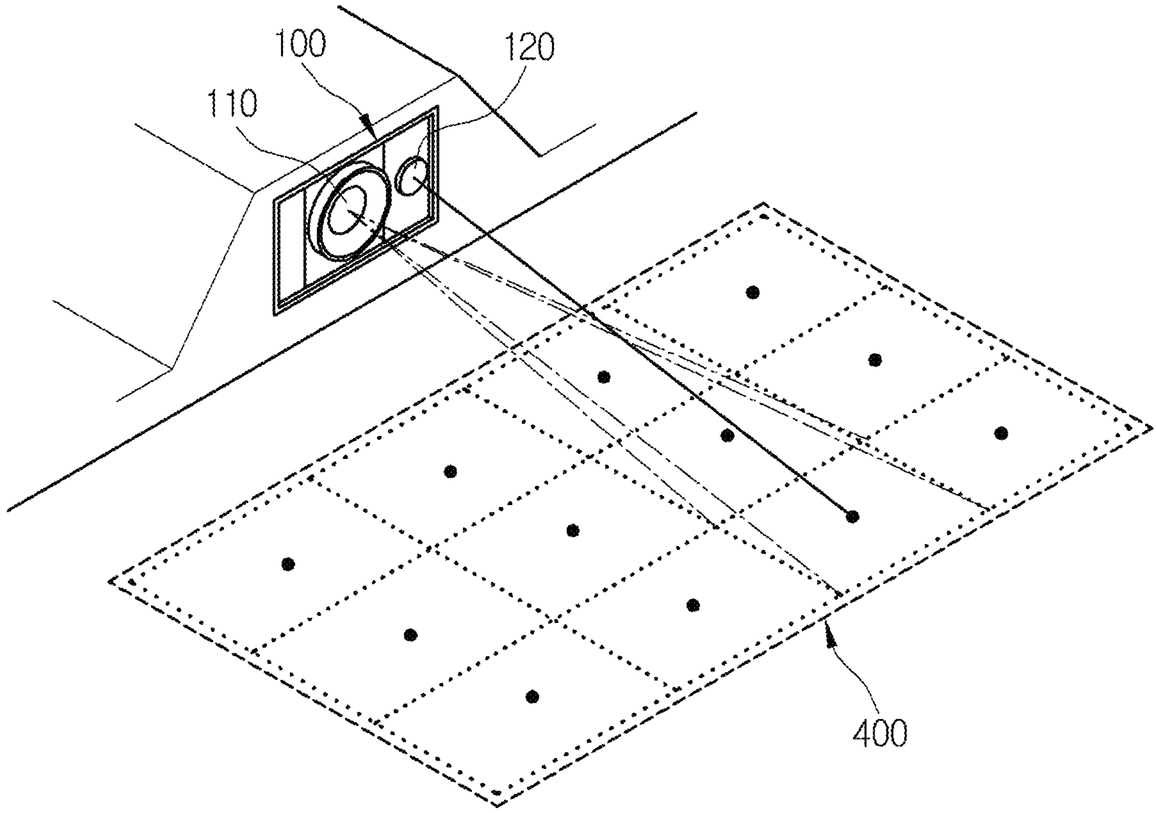
FIG. 3 is a diagram for describing an operation of a laser scanner buried in a road edge area according to an embodiment of the present disclosure.

FIG. 3 is a diagram for describing an operation of a laser scanner buried in a road edge area according to an embodiment of the present disclosure.

The laser scanner 100 located on the curb looks at the road surface through the opening. The laser scanner 100 has an area in charge 400 from which it will deice black ice on the road surface. The area in charge 400 for one laser scanner 100 may be designated at the time of installation of the laser scanner 100, and after installation, each area in charge 400 may be designated through the alignment and allocation process between a series of plural laser scanners 100. The points on the road surface are virtual points and represent points where the temperature of the area in charge 400 is measured by the infrared temperature sensor 120. The galvanometer 110 and the infrared temperature sensor 120 move by the operation of the actuator 150, and the infrared temperature sensor 120 detects infrared rays generated at different points on the road surface while moving along a predetermined path. The temperature corresponding to the detected infrared rays may be transmitted from the laser scanner 100 to the integrated controller 200 through the communication connection.

In the embodiment of FIG. 3 described above, the laser scanner 100 is illustrated as installed on the curb of a road, but the present disclosure is not limited thereto. The laser scanner 100 may be installed on the bridge railing or protective wall to deice the black ice on the road surface at the top of the bridge.

Referring back to FIG. 2, the control unit 160 controls each component of f the laser scanner 100. Specifically, the control unit 160 may control the galvanometer 110, the infrared temperature sensor 120, the laser light source unit 130, and the actuator 150. The control unit 160 may generate and control a pulse signal that turns on and off the laser light source unit 130. The control unit 160 may control the galvanometer 110 so that the laser emitted from the laser light source unit 130 scans the road surface. The control unit 160 may control the infrared temperature sensor 120 to measure temperature at designated points or at regular time intervals. The control unit 160 may control at least one actuator 150 to change the orientation of the galvanometer 110 and/or the infrared temperature sensor 120.

The control unit 160 may be configured to perform the above controls only when receiving a signal activating the laser scanner 100 from the integrated controller 200.

The control unit 160 disclosed in this specification may include or be implemented with a processor, SOC (System On Chip), embedded chip, ARM, SAS, cloud-based driving program, etc.

Figure 4:
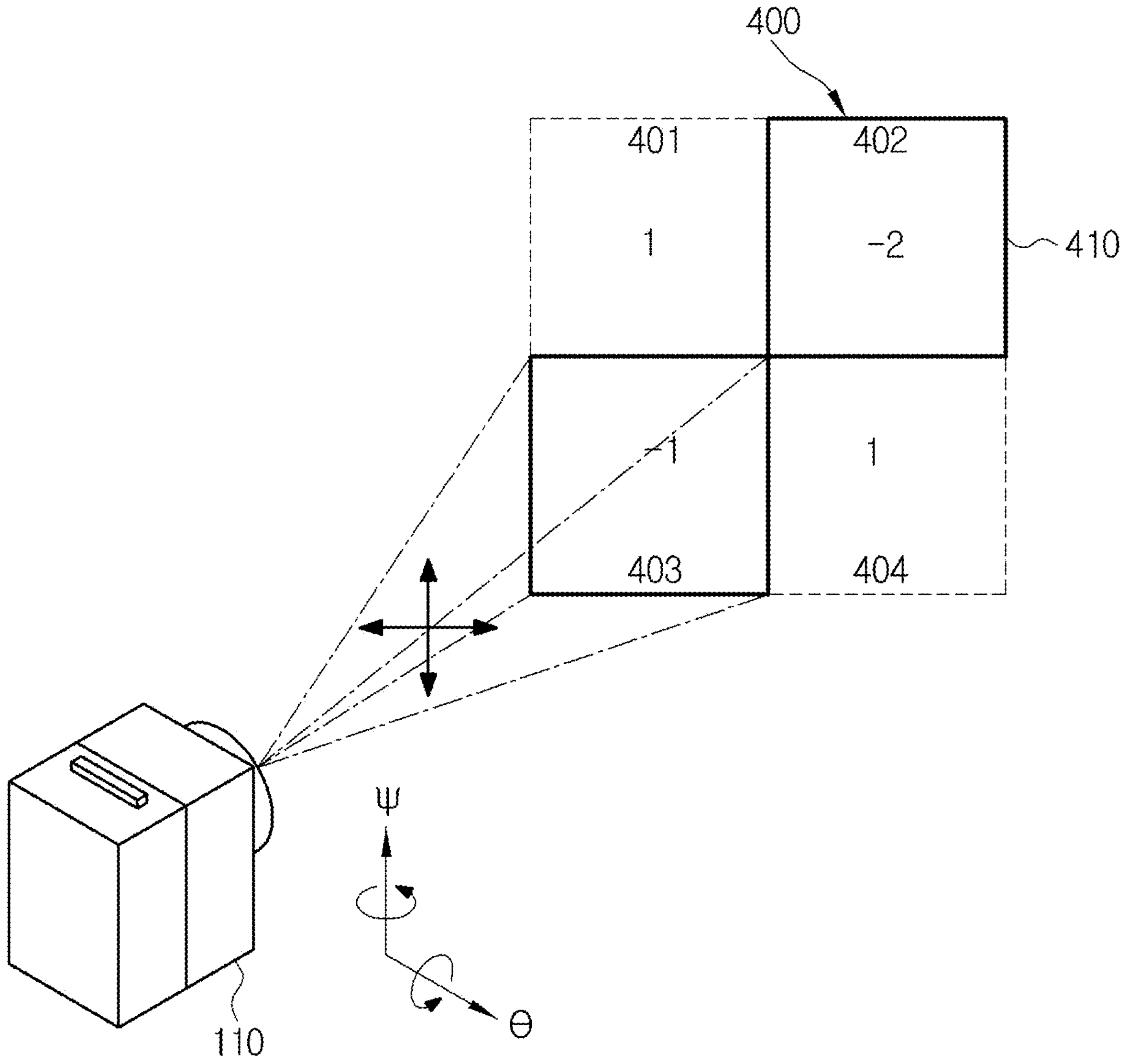
FIG. 4 is a diagram for describing a method of setting a heating area for deicing black ice by a laser scanner according to an embodiment of the present disclosure.

FIG. 4 is a diagram for describing a method of setting a heating area for deicing black ice by a laser scanner according to an embodiment of the present disclosure.

FIG. 4 illustrates the total area in charge 400 covered by one laser scanner 100. The infrared temperature sensor 120 of the laser scanner 100 measures the temperatures of a plurality of points within the area in charge (400). In this example, among the measurement points, there are two points that are above 1° C., and there are two points that are −2° C. and −1° C. less than 0° C. where black ice needs to be deiced. The control unit 160 of the laser scanner 100 may determine points less than 0° C. in the area in charge 400 and set the heating area 410 indicated by a solid line in FIG. 4.

The area in charge 400 includes sub-areas 401, 402, 403, and 404 divided into four based on the area that may be scanned by the galvanometer 110 of the laser scanner 100. The control unit 160 may control the actuator 150 to change the direction of the galvanometer 110 toward each of the sub-areas 401, 402, 403, and 404. In addition, the control unit 160 may control the laser scanner 100 to radiate the laser corresponding to the shape and range of the heating area belonging to each sub-area 402, 403, and 404, 401. Specifically, the control unit 160 generates the pulse signal for the light source unit 130.

FIG. 4 illustrates fixed sub-areas 401, 402, 403, and 404, but is not limited thereto. After measuring the infrared temperature sensor and determining the heating area of the server, when the galvanometer may not laser scan the entire preset heating area at once, the control unit 160 may set the minimum sub-areas based on the heating area. In this case, the actuator 150 may have fewer movements than the three times it moves between the fixed sub-areas 401, 402, 403, and 404.

Figure 5A:
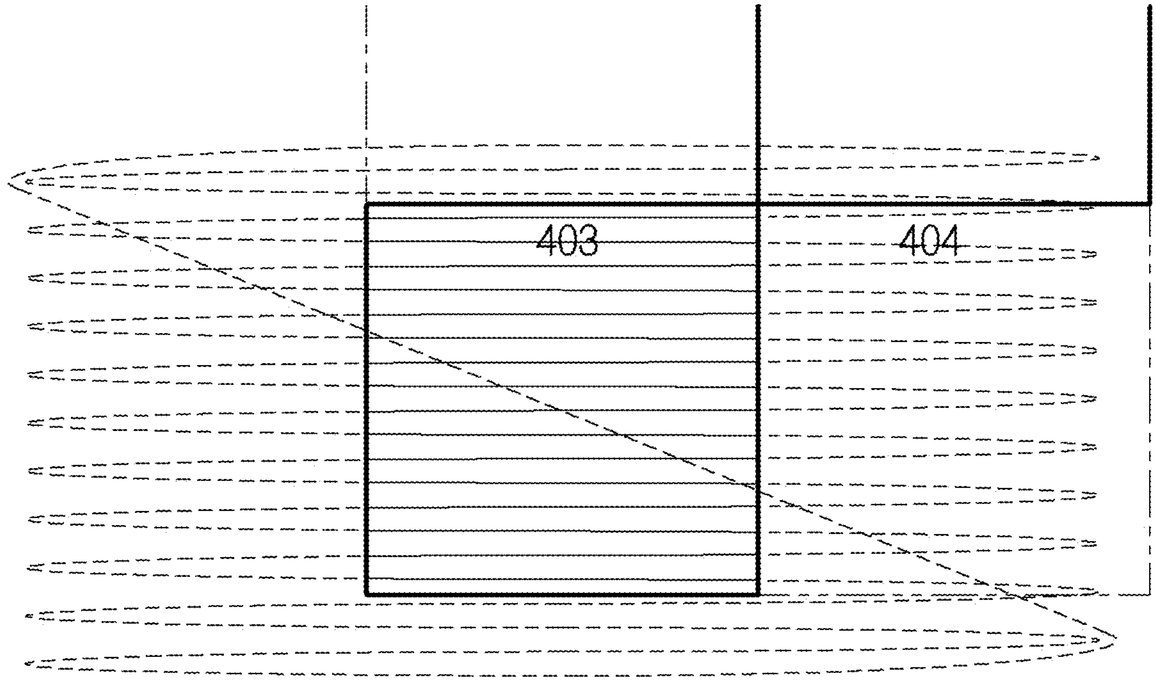
FIGS. 5A and 5B are a diagram for describing a method of laser-scanning a heating area by a laser scanner according to an embodiment of the present disclosure.
Figure 5B:
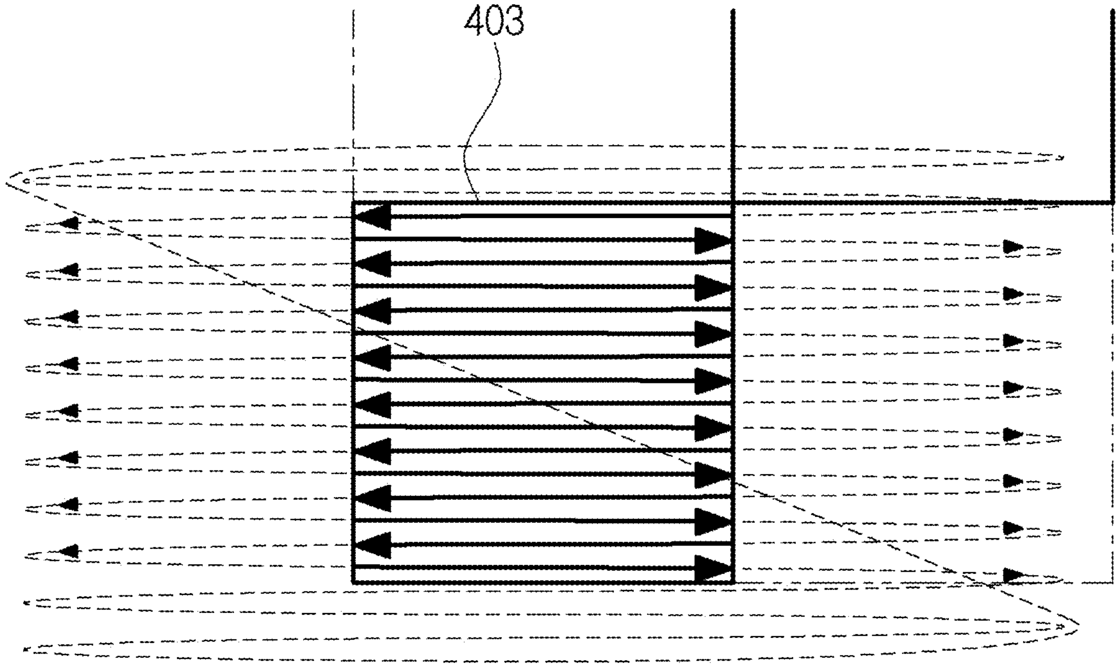

FIGS. 5A and 5B are a diagram for describing a method of laser-scanning a heating area by a laser scanner according to an embodiment of the present disclosure.

First, referring to FIG. 5A, FIG. 5A illustrates two sub-areas 403 and 404 among the sub-areas 401, 402, 403, and 404 of FIG. 4. The sub-area 403 belongs to the heating area 410, and the sub-area 404 does not belong to the heating area 410.

In addition, FIG. 5A illustrates a path along which the laser irradiated by the laser scanner 100 is scanned across the sub-area 403. The position at which the laser enters the road surface starts from the upper left beyond the sub-area 403 and moves along a zigzag path until it reaches the lower right. The laser path that reaches the lower right may then be turned back and start at the upper left (cycle 1). FIGS. 5A and 5B illustrate a raster scan pattern, but the present disclosure is not limited thereto. Depending on the movement of the two reflectors of the galvanometer 110, the laser beam may be radiated in a sinusoidal, helix, or double helix pattern in addition to a linear pattern.

The starting and end points of the laser scan may vary depending on the shape and range of the heating area 410. In the case of the embodiment of FIG. 5A, the galvanometer 110 operates over the entire area that the laser scanner 100 may scan, centered on the sub-area 403. However, differently from this, for example, the start point of the laser scan may be the upper left of the sub-area 403 and the end point may be the lower right of the sub-area 403. The laser that has reached the end point may return to the start point (flyback).

Here, FIG. 5A illustrates a path in which the light source unit 130 of the laser scanner 100 is turned on/off under the control of the control unit 160. Specifically, the light source unit 130 is turned off when the laser radiation location is outside the sub-area 403 and turned on when the laser radiation location is inside the sub-area 403. In FIG. 5A, the light source unit 130 is illustrated as being turned off in the flyback path returning after one cycle of the laser scanning, but may be turned on for the crossing sub-area 403.

Meanwhile, the speed at which the laser radiation location moves may vary. Specifically, the speed at which the reflector of the galvanometer rotates may vary. First, the speed may vary depending on whether the laser reaches the heating area. Referring to FIG. 5B, the laser beam passing through the sub-area 403 belonging to the heating area 410 passes slowly (solid arrow). When the laser beam is directed to a location beyond the heating area 410, the laser irradiation location passes quickly (dotted arrow).

Second, the speed is based on the temperature difference measured within the heating area. For example, the x-axis moving reflector of the galvanometer 110 rotates relatively more slowly when laser scanning the sub-area 402 with a temperature of −2° C., which is relatively lower than the temperature of the sub-area 403 of −1° C. The slow rotation allows a larger amount of laser energy to be injected into the road surface. Conversely, when scanning a sub-area with a relatively high temperature, the x-axis moving reflector of the galvanometer 110 rotates relatively quickly. The fast moving speed may increase efficiency by shortening the time to complete the black ice deicing operation.

The laser scanning speed or the rotation speed of the reflector of the galvanometer may be calculated in the control unit 160. The control unit 160 may control the galvanometer 110 to change the speed at which the laser scanner 100 scans the laser based on the temperature difference at the measured point.

As another modified example, the number of times of cycles for scanning the laser to the sub-area may vary depending on the measured temperature. That is, the laser scanner 100 stays longer for a heating are with a relatively lower temperature and stays shorter for a heating area with a relatively higher temperature to scan the laser.

Figure 6:
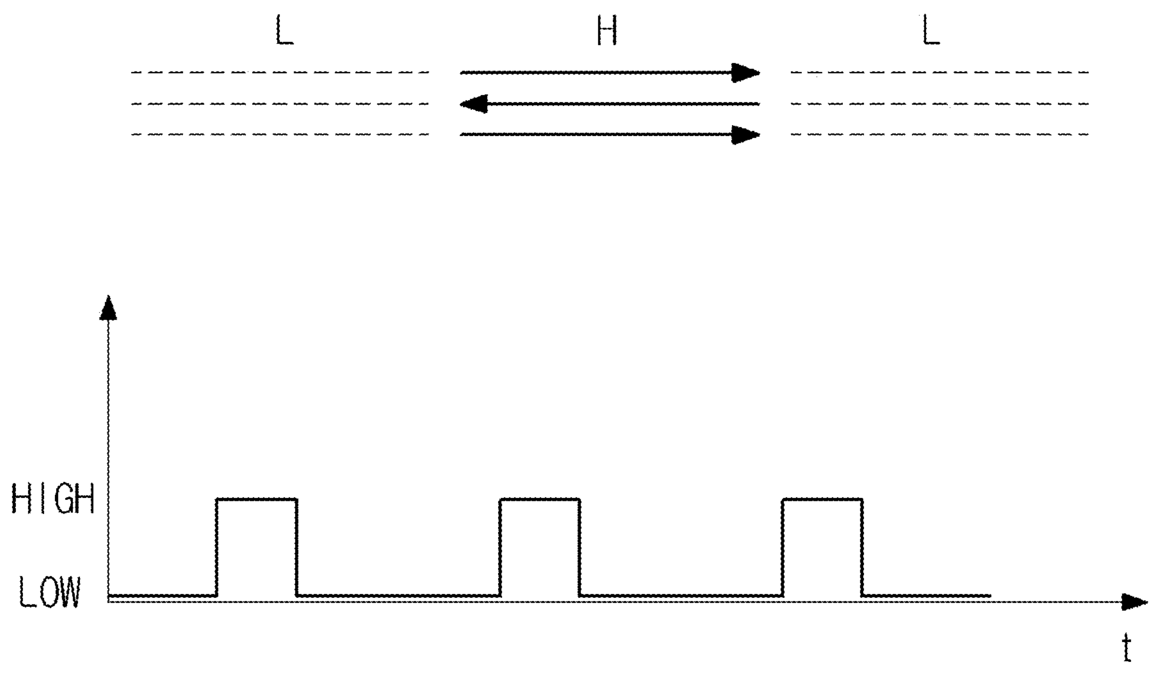
FIG. 6 is a graph illustrating an example of a scanning line of a laser scanner and a pulse signal for controlling the laser scanner according to an embodiment of the present disclosure.

FIG. 6 is a graph showing an example of a pulse signal that controls a laser scanner according to an embodiment of the present disclosure.

Referring to FIG. 6, three scanning lines pass across the road surface. One portion of the scan line length belongs to the heating area. Therefore, the light source unit of the laser scanner is turned off when passing through portions that do not belong to the heating area, and the light source unit is turned on when passing through portions that are included in the heating area. The control unit 160 generates the pulse signal for controlling the turn on-off of the light source unit 130 of the laser scanner 100.

FIG. 6 also illustrates a graph of the pulse signal for controlling the turn on-off of the light source unit. In an embodiment including the galvanometer, the x-axis rotation frequency of the reflector for drawing one scan line is fixed. Accordingly, the cycle of the pulse signal may be tuned to the rotation speed or frequency of the reflector.

The control unit 160 may set the cycle of the pulse signal based on the speed at which the reflector of the galvanometer 110 rotates. In the embodiment of FIG. 6, the pulse signal has a length of 3 cycles to control 3 scan lines. The control unit 160 may set the on-off duty ratio of the pulse signal based on the ratio of the width of the heating area to the length of the scan line of the laser that can be irradiated to the road surface by the galvanometer 110. In the illustrated embodiment, the width of the heating area is ⅓ of the total scan line length, so the control unit 160 generates the pulse signal with the duty ratio of ⅓.

Figure 7:
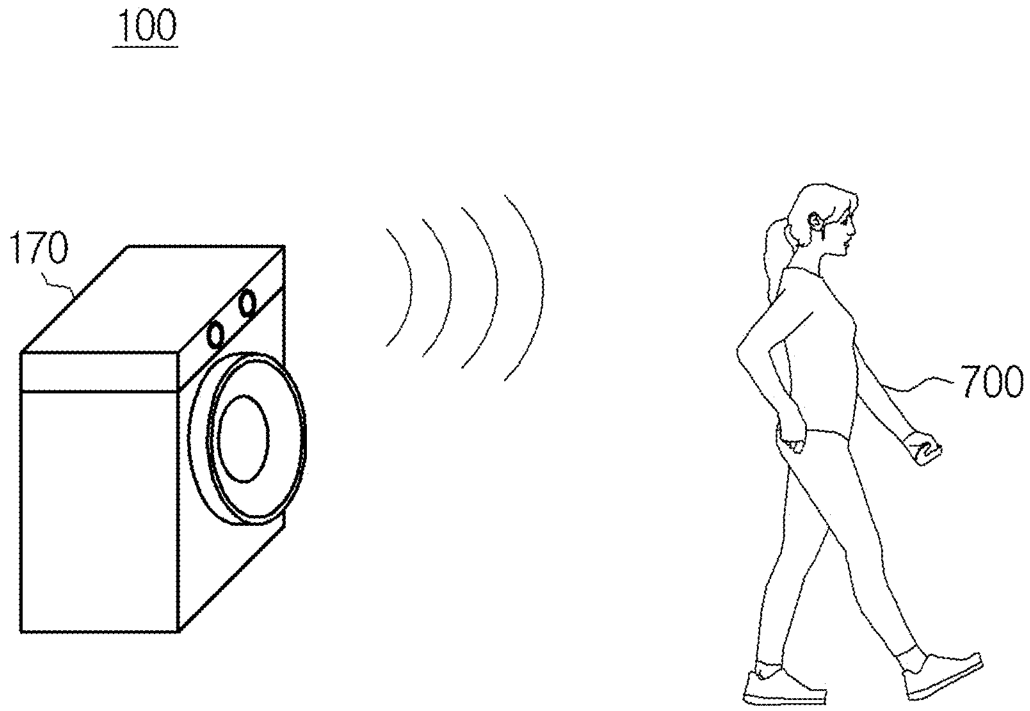
FIG. 7 is a diagram illustrating a configuration of the laser scanner including an ultrasonic sensor according to an embodiment of the present disclosure.

FIG. 7 is a diagram illustrating the configuration of the laser scanner including an ultrasonic sensor according to an embodiment of the present disclosure.

Referring to FIG. 7, the laser scanner 100 includes an ultrasonic sensor 170. The ultrasonic sensor 170 may detect a distance from an object 700 in front. When the ultrasonic sensor 170 transmits a signal detecting the object 700 within a preset distance to the control unit 160, the control unit 160 controls the light source unit 130 to be turned off. The preset distance may be shorter than the distance from the ultrasonic sensor 170 to the road surface. The ultrasonic sensor 170 is used to prevent personal accidents caused by laser heating. Accordingly, the object detection by the ultrasonic sensor 170 takes priority over other signals. For example, the signal from which the ultrasonic sensor 170 detects the object within the preset distance may forcibly turn off the light source unit 130, regardless of the control of the control unit 160. Alternatively, the detection signal of the ultrasonic sensor 170 is transmitted to the integrated controller 200, and the integrated controller 200 may deactivate the laser scanner 100 regardless of the control command of the server 300.

As described above, according to the system of the present disclosure, it is possible to deice the black ice generated on the road surface by controlling the radiation of the invisible light. It is possible for the weather sensor to accurately determine whether to deice the black ice, and by setting the heating area in a part of the road surface, it is possible for the non-contact temperature sensor to exactly radiate the laser to the required locations. Accordingly, it is possible to deice the black ice on the road surface or prevent the black ice from being generated on the road surface.

Although embodiments of the present disclosure have been illustrated and described, the present disclosure is not limited to the above-mentioned specific embodiment, but May be variously modified by those skilled in the art to which the present disclosure pertains without departing from the spirit and scope of the present disclosure as claimed in the claims. In addition, such modifications should also be understood to fall within the scope of the present disclosure.

What is claimed is:

1. A system for deicing black ice on a road surface using invisible light based on AI, comprising:

a plurality of laser scanners that are arranged at intervals along a road, each laser scanner including a light source unit that emits a laser, a non-contact temperature sensor that measures a temperature of an area in charge of the road surface, and a control unit that controls an operation of radiating the laser to the area in charge;

a weather sensor that measures a temperature and humidity of a surrounding environment; and an integrated controller that communicates with the plurality of laser scanners, wherein the integrated controller determines whether the laser is radiated to the road surface based on at least one of the temperature and humidity measured by the weather sensor, and when the laser radiation is determined, generates a control signal to activate at least one laser scanner to be operated among the plurality of laser scanners, and the control unit of the laser scanner activated by the integrated controller determines a heating area requiring the laser radiation in the area in charge based on the temperature measured by the non-contact temperature sensor, and generates a pulse signal to turn on/off a light source unit of the at least one activated laser scanner so that the laser is radiated in accordance with a shape and range of the heating area; and wherein the laser scanner includes a galvanometer including two reflectors each rotating about different orthogonal axes x and y, and the control unit sets a cycle of the pulse signal based on a speed at which the reflector rotates.

2. The system of claim 1, wherein the control unit sets an on-off duty ratio of the pulse signal based on a ratio of a width of the heating area to a length of the scanning line of the laser that can be radiated to the road surface by the galvanometer.

3. The system of claim 2, wherein the control unit sets the heating area encompassing a plurality of points with different temperatures measured by the non-contact temperature sensor, and controls the galvanometer so that the speed at which the reflector rotates varies based on the temperature difference.

4. The system of claim 1, wherein each of the laser scanners further includes an ultrasonic sensor that detects a distance from an object existing on the road surface, and the control unit controls the light source unit to be turned off when the ultrasonic sensor detects the object within a preset distance.

5. The system of claim 1, further comprising:

a server that remotely communicates with the integrated controller, wherein the server transmits a control command for controlling each of the plurality of scanners to the integrated controller.

6. The system of claim 1, further comprising:

a camera that captures the road surface, wherein the integrated controller determines a road surface condition by analyzing a road surface image captured by the camera through an AI learning model, and determines whether the black ice is generated on the road surface and whether the laser is radiated to the road surface according to the determined road surface condition.

7. The system of claim 6, wherein the integrated controller determines whether to activate the laser scanner based on big data including topographical characteristics, regional weather, temperature, and humidity information.

8. The system of claim 1, further comprising:

a camera that captures the road surface, wherein the integrated controller detects topography on the road surface by analyzing the image captured by the camera through an AI learning model, and controls the laser scanner to selectively radiate the laser according to the topography on the road surface.

9. The system of claim 1, wherein each of the laser scanners further includes an actuator that changes a direction in which the galvanometer is directed, and the control unit controls the actuator to change the direction of the laser scanner toward the heating area.

* * * * *